Dec. 16, 1930.                I. V. EDGERTON                1,784,826
                        WATER TANK FOR STOCK CARS
                        Original Filed May 19, 1927
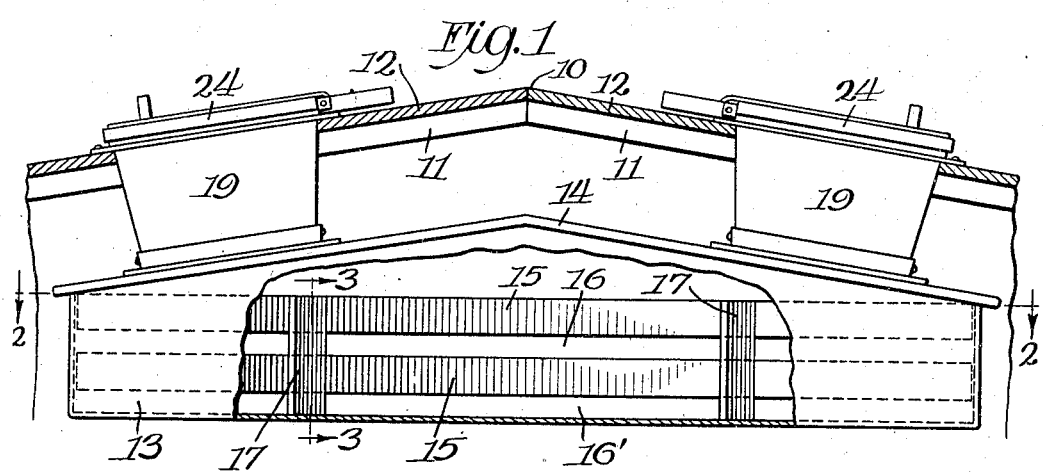
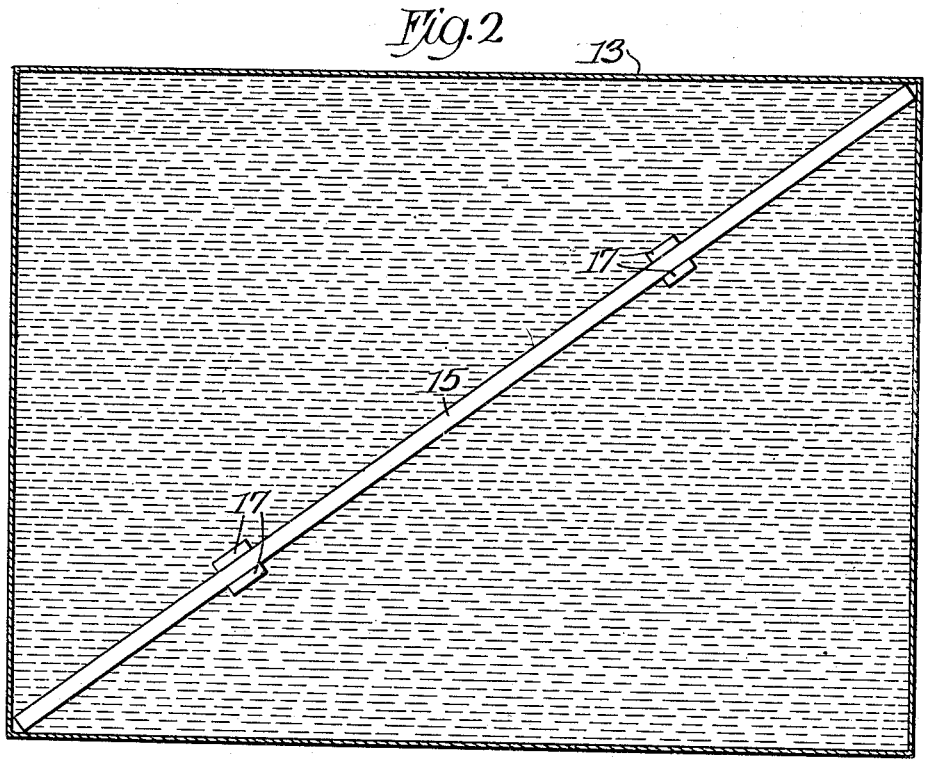
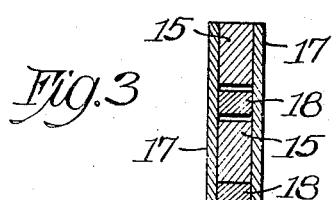
Inventor
Israel V. Edgerton
By Fisher, Clapp, Soans & Pond, Attys.

Patented Dec. 16, 1930

1,784,826

UNITED STATES PATENT OFFICE

ISRAEL V. EDGERTON, OF CHICAGO, ILLINOIS, ASSIGNOR TO PALACE POULTRY CAR COMPANY, OF CHICAGO, ILLINOIS, A CORPORATION OF ILLINOIS

WATER TANK FOR STOCK CARS

Original application filed May 19, 1927, Serial No. 192,609, now Patent No. 1,711,112, dated April 30, 1929. Divided and this application filed January 9, 1929. Serial No. 331,250.

This invention relates to the art of railway cars designed for the transportation of live stock, and in its chief intended application has reference to cars designed for the transportation of live poultry.

Poultry cars as at present constructed are usually equipped with tiers of coops disposed on opposite sides of a longitudinal aisle, and formed with a central room or compartment constituting living and sleeping quarters for the attendant in charge of the shipment and for the storage of feed. In the upper portion of this central compartment and directly beneath the roof of the car is customarily located a water tank, with pipes running therefrom toward the ends of the car for supplying water to the stock. Such water tanks are commonly provided with one or more filling spouts that extend from the top of the tank upwardly through the roof of the car and are equipped with lids or covers.

My present invention has to do with this water tank. It has been found by experience that, under the more or less sudden and jerky stopping and starting movements of the car, the water in the tank surges violently from side to side of the latter and the blows of the water against the side walls of the tank impose considerable strain, sometimes causing the sides to spring and leak. The main object of the present invention is to provide a simple, efficient and inexpensive means in the general nature of a baffle for checking the surging action of the water.

The manner and means by which the above stated object is secured will be readily understood by those skilled in the art from the following detailed description, taken in connection with the accompanying drawing wherein I have illustrated a practical and preferred embodiment of the invention, and in which—

Fig. 1 is a transverse vertical section through the portion of the roof of the car directly above the stateroom, showing the underlying water tank in side elevation, partly broken out and in section;

Fig. 2 is a horizontal section through the water tank on the line 2—2 of Fig. 1, and in the horizontal plane of the upper edge of the baffle;

Fig. 3 is a vertical section on an enlarged scale through the water tank baffle, on the line 3—3 of Fig. 1.

Referring to the drawing, 10 designates as an entirety the central roof portion of a poultry car, which includes the usual rafters 11 and roof boards 12. Suitably mounted by any approved means (not shown) directly beneath this central compartment of the roof is the rectangular water tank designated as an entirety by 13, said tank consisting of a completely enclosed structure including a roof or cover 14, the sloping sides of which are preferably substantially parallel with the sloping sides of the car roof 10.

Mounted in the roof 14 of the tank are spouts or chutes 19 extending through the roof of the car, through which the tank is adapted to be filled from overhead, and surmounting and sealing the upper ends of these spouts or chutes are hinged covers 24. With the structural details of these spouts and their covers the present invention is not concerned; the same forming the subject-matter of Letters Patent No. 1,711,112 granted April 30, 1929, of which patent the present application forms a division.

Disposed within the tank 13 and preferably extending obliquely between diagonally opposite corners of the latter is a baffle. In the preferred form herein shown this baffle comprises a pair of narrow flat wooden strips or planks 15 separated from each other by an intermediate space 16, and united by two pairs of cross cleats 17 nailed or otherwise secured thereto. The cleats 17 are of somewhat greater length than the combined width of the planks 15 and the intermediate space 16, as shown in Fig. 1, so that when the baffle rests on the bottom of the tank there is a space 16' between the lower plank and the floor of the tank about equal in width to the space 16 between the planks. Blocks 18 (Fig. 3) of the width of the cleats 17 may be interposed between the latter in the spaces 16 and 16' for greater strength, if desired, and to assist in breaking up the surging of the water lengthwise of the baffle, but these blocks 18 are not essential. The baffle thus formed does not require to be fastened in or to the tank, but is of a length such that its ends will just straddle the diagonally opposite corners of the tank, as shown in Fig. 2, whereby the side and end walls of the tank support the baffle against lateral displacement in either direction, except for such slight bending movement as may be caused by the pressure of the water when in motion. From the foregoing it will be seen that the described baffle, by partly restricting the rushing movement of the water between the opposite side walls and opposite end walls of the tank greatly reduces the blows of the water on said walls, while at the same time permitting passage of the water through the baffle and thus allowing water to normally stand at equal heights on both sides of the baffle.

I claim—

1. In combination with a rectangular water tank, a baffle removably mounted in said tank comprising a plurality of flat strips spaced edgewise with their ends interfittingly engaged with diagonally opposite corners of the tank, and cleats secured to and crosswise of both sides of said strips, said cleats extending beyond the lowermost strip and resting on the bottom of the tank.

2. In combination with a vehicle, a rectangular water tank mounted in said vehicle, and a removable skeleton baffle having its ends interfittingly engaged with and confined laterally by the side and end walls of said tank at diagonally opposite corners of the latter.

3. In combination with a vehicle, a water tank mounted in said vehicle, and a vertically disposed skeleton baffle in said tank disposed obliquely to the vertical plane of the longitudinal median line of said vehicle.

ISRAEL V. EDGERTON.